United States Patent
Wang et al.

(10) Patent No.: US 9,429,751 B2
(45) Date of Patent: Aug. 30, 2016

(54) ANTI-PEEPING DEVICE AND CONTROL METHOD

(71) Applicant: BOE Technology Group Co., Ltd., Beijing (CN)

(72) Inventors: Xinan Wang, Beijing (CN); Wenbo Li, Beijing (CN)

(73) Assignee: BOE Technology Group Co., Ltd., Beijing (CN)

(*) Notice: Subject to any disclaimer, the term of this patent is extended or adjusted under 35 U.S.C. 154(b) by 33 days.

(21) Appl. No.: 14/551,835

(22) Filed: Nov. 24, 2014

(65) Prior Publication Data
US 2016/0011412 A1  Jan. 14, 2016

(30) Foreign Application Priority Data
Jul. 11, 2014 (CN) .......................... 2014 1 0331683

(51) Int. Cl.
*G02B 26/02* (2006.01)
*G02B 27/00* (2006.01)
*G02F 1/1335* (2006.01)
*G02B 26/08* (2006.01)

(52) U.S. Cl.
CPC ........... *G02B 27/0093* (2013.01); *G02B 26/08* (2013.01); *G02F 1/133524* (2013.01); *G02B 2207/123* (2013.01)

(58) Field of Classification Search
CPC  G02B 2207/123; G02B 26/08; G02B 26/02; G02B 27/0093; G02F 1/133524
USPC ................................. 359/227, 230, 234, 235
See application file for complete search history.

(56) References Cited

U.S. PATENT DOCUMENTS

2016/0087670 A1* 3/2016 Lee ...................... H04B 1/3888
455/575.8

FOREIGN PATENT DOCUMENTS

CN          104533161 A  *  4/2014

* cited by examiner

*Primary Examiner* — James Phan
(74) *Attorney, Agent, or Firm* — Westman, Champlin & Koehler, P.A.

(57) ABSTRACT

The present invention provides an anti-peeping device comprising: a plate-shaped substrate; a magnetic field generating device disposed on the plate-shaped substrate for generating a magnetic field; a plurality of light blocking walls deflectably connected to the plate-shaped substrate and configured to be changeable in its deflecting direction and/or deflecting angle in response to a change in a direction and/or an intensity of the magnetic field; a magnetic field control device; and a user input device for receiving an instruction from a user. The magnetic field control device is configured to control the magnetic field generating device to adjust the direction and/or the intensity of the magnetic field based on an instruction received from the user input device, so as to change the deflecting direction and/or the deflecting angle of the light blocking walls. The present invention further comprises a control method for an anti-peeping device.

19 Claims, 4 Drawing Sheets

ANTI-PEEPING DEVICE AND CONTROL METHOD

CROSS-REFERENCE TO RELATED APPLICATION

This application claims the benefit of Chinese Patent Application No. 201410331683.9 filed on Jul. 11, 2014 in the State Intellectual Property Office of China, the whole disclosure of which is incorporated herein by reference.

BACKGROUND OF THE INVENTION

1. Field of the Invention

The present invention generally relates to the field of display technology, and more specifically to an anti-peeping device for a display device and a control method for the anti-peeping device.

2. Description of the Related Art

At present, a conventional anti-peeping device or anti-peeping film is based on a grating that blocks light at certain angles, so that a user can watch contents output by a display device only at an allowed range of viewing angle. If a user stands out of the allowed range predetermined during manufacture of the anti-peeping device, he/she will not be able to watch the contents of the display device.

For example, an existing anti-peeping device is shown in FIG. 1. The anti-peeping device comprises a plate-shaped substrate 1, and a plurality of light blocking walls 2 fixed on the plate-shaped substrate 1. Each of the light blocking walls 2 is disposed perpendicularly to the plate-shaped substrate 1. As shown in FIG. 1, depending on the way in which each of the light blocking walls 2 is disposed, a region between a sightline a and a sightline b is an allowed watching region, and a region at the left side of the sightline a and a region at the right side of the sightline b are unallowed watching regions. Users standing in the allowed watching region can view at least parts of the content from a display device, and users standing in the unallowed watching region cannot view the content from the display device totally or at least cannot view the content from the display device clearly.

In another example, as shown in FIG. 2, a plurality of light blocking walls 2 are fixed on the plate-shaped substrate 1, and each of the light blocking walls 2 is inclined towards the left side, so that it forms a sharp angle to the left side of the plate-shaped substrate 1, and forms an obtuse angle to the right side of the plate-shaped substrate 1. As shown in FIG. 2, depending on the way in which each of the light blocking walls 2 is disposed, a region between a sightline a and a sightline b is an allowed watching region, and a region at the left side of the sightline a and a region at the right side of the sightline b are unallowed watching regions. Users standing in the allowed watching region can view at least parts of the content from a display device, and users standing in the unallowed watching region cannot see the content from the display device totally or at least cannot view the content from the display device clearly.

In a further example, as shown in FIG. 3, a plurality of light blocking walls 2 are fixed on the plate-shaped substrate 1 and each of the light blocking walls 2 is inclined towards the right side, so that it forms a sharp angle to the right side of the plate-shaped substrate 1, and forms an obtuse angle to the left side of the plate-shaped substrate 1. As shown in FIG. 3, depending on the way in which each of the light blocking walls 2 is disposed, a region between a sightline a and a sightline b is an allowed watching region, and a region at the left side of the sightline a and a region at the right side of the sightline b are unallowed watching regions. Users standing in the allowed watching region can view at least parts of the content from a display device, and users standing in the unallowed watching region cannot view the content from the display device totally or at least cannot view the content from the display device clearly.

From the above examples, the inventor finds that, since the light blocking walls 2 are fixedly attached to the plate-shaped substrate 1, the angle formed between each light blocking wall 2 and the plate-shaped substrate 1 is fixed. That is to say, a light blocking angle of each light blocking wall 2 is fixed, and the allowed watching region and the unallowed watching regions are also fixed. If a user wants to change the allowed watching region and the unallowed watching regions, he or she has to replace the anti-peeping device with another one of a different type.

Therefore, safety and applicability of current anti-peeping devices are poor, and users have to buy different anti-peeping devices, which leads to a high cost.

SUMMARY OF THE INVENTION

The present invention has been made to overcome or alleviate at least one aspect of the above mentioned disadvantages.

Accordingly, an object of the present invention is to provide an anti-peeping device and a control method for the anti-peeping device, in which an unallowed range of viewing angle of the anti-peeping device can be adjusted as required.

According to an aspect of the present invention, there is provided an anti-peeping device.

In one embodiment of the present invention, an anti-peeping device comprises: a plate-shaped substrate; a magnetic field generating device disposed on the plate-shaped substrate for generating a magnetic field; a plurality of light blocking walls disposed on the plate-shaped substrate to be within the magnetic field, the plurality of light blocking walls being disposed in parallel with and spaced apart from one another, a first end of each light blocking wall being deflectably connected to the plate-shaped substrate, and each light blocking wall being configured to be changeable in its deflecting direction and/or deflecting angle in response to a change in a direction and/or an intensity of the magnetic field; a magnetic field control device for controlling the direction and intensity of the magnetic field; and a user input device for receiving an instruction from a user. The magnetic field control device is configured to control the magnetic field generating device to adjust the direction and/or the intensity of the magnetic field based on an instruction received from the user input device, so as to change the deflecting direction and/or the deflecting angle of the light blocking walls.

In another embodiment of the present invention, an anti-peeping device comprises: a plate-shaped substrate; a magnetic field generating device disposed on the plate-shaped substrate for generating a magnetic field; a plurality of light blocking walls disposed on the plate-shaped substrate to be within the magnetic field, the plurality of light blocking walls being disposed in parallel with and spaced apart from one another, a first end of each light blocking wall being deflectably connected to the plate-shaped substrate, and each light blocking wall being configured to be changeable in its deflecting direction and/or deflecting angle in response to a change in the direction and/or the intensity of the magnetic field; an information acquiring device for acquiring features of a current user's face; and a processing device. The processing device is configured to receive the acquired features, perform a comparison between the acquired features and predetermined features of a predetermined user's face stored therein, and control the anti-peeping device based on a result of the comparison.

According to another aspect of the present invention, there is provided a control method for an anti-peeping device.

In one embodiment of the present invention, a control method for an anti-peeping device comprises steps of: inputting an instruction through the user input device; and adjusting the direction and/or intensity of the magnetic field generated by the magnetic field generating device through the magnetic field control device.

In another embodiment of the present invention, a control method for an anti-peeping device comprises steps of: acquiring features of a current user's face by the information acquiring device; performing a comparison between the acquired features and the predetermined features to determine whether or not the current user is the predetermined user; acquiring a position information of the current user in real time if it is determined that the current user is the predetermined user; and adjusting the direction and/or the intensity of the magnetic field generated by the magnetic field generating device based on a relative position between the current user and the anti-peeping device.

With the anti-peeping device of the present application, the unallowed range of viewing angle of the anti-peeping device can be adjusted to improve the anti-peeping performance. Furthermore, since the unallowed range of viewing angle of the anti-peeping device can be changed, users do not have to replace the anti-peeping device to change the allowed and the unallowed watching regions, so that overall usage cost for the users can be reduced.

BRIEF DESCRIPTION OF THE DRAWINGS

The above and other features of the present invention will become more apparent by describing in detail exemplary embodiments thereof with reference to the accompanying drawings, in which.

Figure 1:
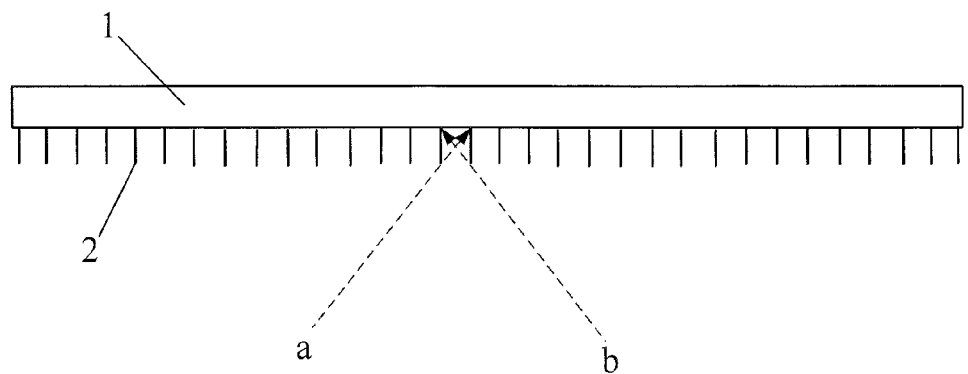
FIG. 1 is a structure schematic drawing of an existing anti-peeping device.
Figure 2:
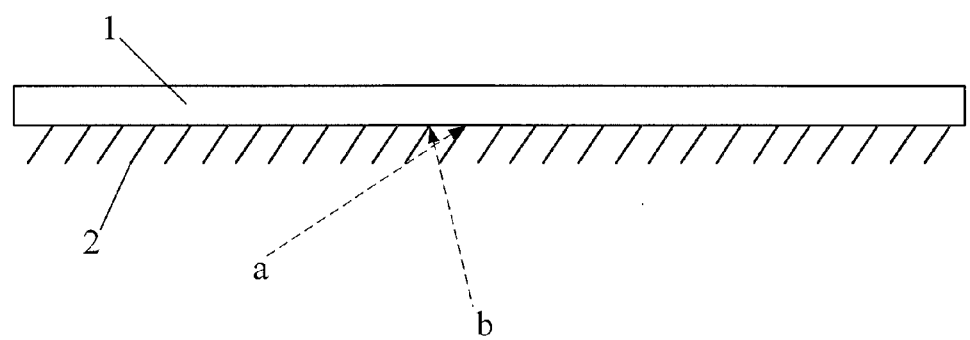
FIG. 2 is a structure schematic drawing of another existing anti-peeping device.
Figure 3:
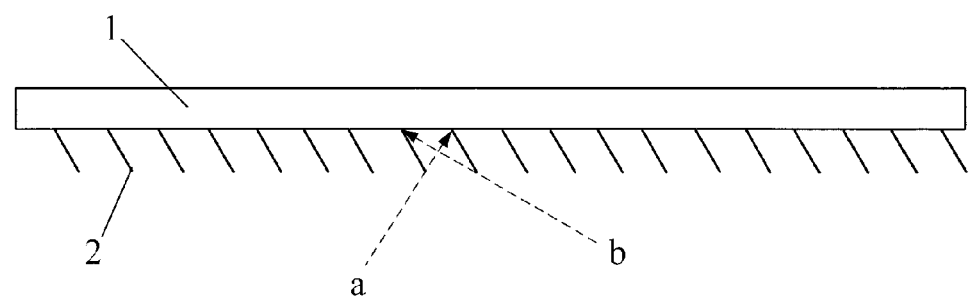
FIG. 3 is a structure schematic drawing of still another existing anti-peeping device.

List of reference numbers in the drawings:

1: plate-shaped substrate
2: electromagnetic component
3: light blocking wall
4: transparent cover plate

DETAILED DESCRIPTION OF PREFERRED EMBODIMENTS OF THE INVENTION

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

It is to be noted that, throughout the specification, the terms indicating directions or position relations, such as "center", "up", "down", "front", "rear", "left", "right", "vertical", "horizontal", "top", "bottom", "inner", and "outer", are based on the attached drawings, and are used to simplify the description of the present invention. These terms do not mean to indicate or imply that certain device or component should have a certain orientation or should be specifically constructed, and these terms should not be considered as a limitation to the present invention. Besides, the term "connection" used herein may be an "electrical connection", a "wireless connection", and/or a "physical connection", as long as such a connection can achieve desired effects.

First Embodiment

Figure 4:
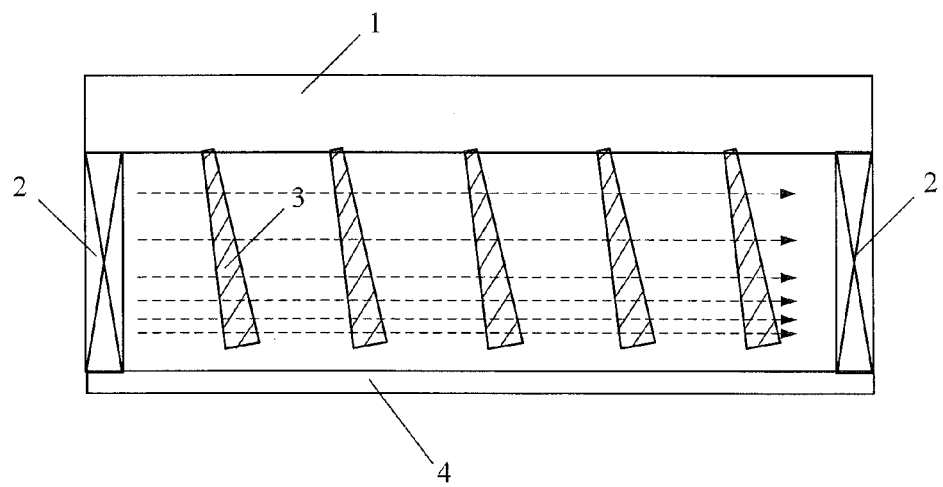
FIG. 4 is a structure schematic drawing of an anti-peeping device according to a first embodiment of the present invention.

FIG. 4 is a structure schematic drawing of an anti-peeping device according to a first embodiment of the present invention. As shown in FIG. 4, the anti-peeping device according to the first embodiment of the present invention comprises: a transparent plate-shaped substrate 1; a magnetic field generating device disposed on the plate-shaped substrate 1; a plurality of light blocking walls 3 deflectably connected to the plate-shaped substrate 1 and disposed in parallel with each other; a magnetic field control device (not shown) connected to the magnetic field generating device; and a user input device (not shown) connected to the magnetic field control device. The magnetic field generating device may comprise at least one pair of electromagnetic components 2.

The plurality of light blocking walls 3 are disposed in one row and spaced apart from each other. A first end of each light blocking wall 3 is deflectably connected to the plate-shaped substrate 1, and a second end of each light blocking wall 3 opposite to the first end is a free end. With such an arrangement, when a magnetic field is generated by the electromagnetic components 2, all light blocking walls 3 are in the magnetic field. Each light blocking wall is configured to be deflectable in response to a change in direction and/or intensity of the magnetic field generated by the electromagnetic components 2. In one example, each light blocking wall 3 is provided with a plurality of magnetic particles (not shown), so that the light blocking wall 3 can be deflected in a clockwise direction or a counterclockwise direction by the magnetic particles under influence of the magnetic field. In other examples, each light blocking wall 3 may be provided with other magnetic objects, such as a permanent magnet.

Users may input data, information, or instructions concerning control of the magnetic field, and the magnetic field control device may adjust direction and/or intensity of the magnetic field according to the input data, information, or instructions, so that the light blocking walls 3 can be deflected to a desired deflecting direction and/or to a desired deflecting angle.

The plate-shaped substrate 1 may be a separate transparent substrate or a part of, for example, a display panel. In other words, the plate-shaped substrate 1 is not a necessary part of the anti-peeping device. When the plate-shaped substrate 1 is provided by a separate transparent substrate, it can be secured to a display panel through suitable ways, for example, attaching or embedding. When the plate-shaped substrate 1 is a component of a display panel, for example, a color filter substrate of the display panel, the electromagnetic components 2 and the light blocking walls 3 may be directly disposed on a surface of the component, such that light from the display panel may be directly emitted through regions between adjacent light blocking walls 3, and entire weight of a combination of the anti-peeping device and the display panel may be reduced.

In this embodiment, only one pair of electromagnetic components 2 is provided. As shown in FIG. 4, two electromagnetic components 2 are disposed at two ends of the plate-shaped substrate 1 respectively, with the light blocking walls 3 located between the two electromagnetic components 2.

Figure 5:
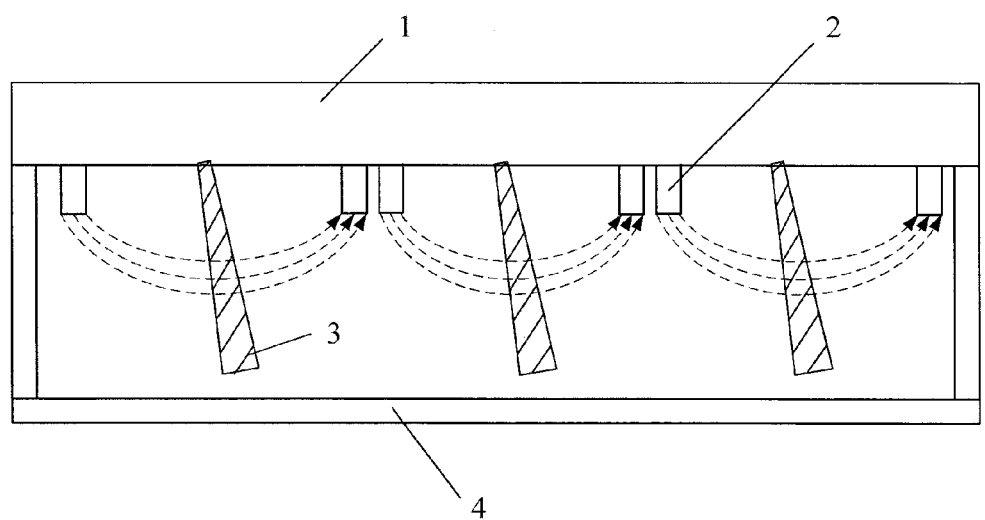
FIG. 5 is a schematic drawing of an anti-peeping device according to an alternative embodiment of the first embodiment of the present invention.

In an alternative embodiment, there may be provided a plurality of pairs of electromagnetic components 2. As shown FIG. 5, a pair of electromagnetic components 2 is provided for each light blocking wall 3, so that each light blocking wall 3 is arranged between a respective pair of electromagnetic components 2.

According to the first embodiment of the present invention, each electromagnetic component 2 usually comprises a core and a coil surrounding the core. When a pair of electromagnetic components 2 is energized with a current, a magnetic field is generated between the pair of electromagnetic components 2. Direction and/or intensity of the magnetic field can be changed through changing direction and/or intensity of the current. In addition, magnetic fields with different directions and intensities can be generated by different pairs of electromagnetic components 2, which may be selected as required. Therefore, according to the alternative embodiment of the first embodiment of the present invention, each light blocking wall 3 may be controlled individually.

Still referring to FIG. 4, the plurality of light blocking walls 3 may be arranged at equal intervals or different intervals. Each light blocking wall 3 may be a rigid light blocking wall, with the first end thereof connected to the plate-shaped substrate 1 via a flexible connection, so that the light blocking wall 3 is deflectable with respect to the plate-shaped substrate 1. Or, each light blocking wall 3 may be a flexible light blocking wall, such that the first end of each light blocking wall 3 may be directly connected to the plate-shaped substrate 1, and the light blocking wall itself can provide the deflection characteristic.

Each light blocking wall 3 comprises a plurality of magnetic particles, and the magnetic particles may be formed by rare earth magnets, so that the light blocking wall 3 may be deflected by the magnetic particles under the influence of a magnetic field. Density distribution of the magnetic particles and shape of a cross-section of the light block wall 3 may be selected based on the magnetic field generated by the electromagnetic components 2.

Specifically, as shown in FIG. 4, when the shape of the cross-section of each light blocking wall 3 is a trapezoid or a triangle whose width gradually increases from the first end to the second free end thereof, the density distribution of the magnetic particles may be uniform, or also increases from the first end to the second free end of the light blocking wall 3. The magnetic field generated by the electromagnetic components 2 may be a uniform magnetic field or a non-uniform magnetic field. Intensity of the non-uniform magnetic field increases from the first end to the second end of the light blocking wall 3.

When the shape of the cross-section of each light blocking wall 3 is a rectangle, the density distribution of the magnetic particles may be uniform or non-uniform. In one example, the magnetic field generated by the electromagnetic components 2 is a uniform magnetic field, and the density distribution of the magnetic particles increases from the first end to the second free end of the light blocking wall 3. In another example, the magnetic field generated by the electromagnetic components 2 is a non-uniform magnetic field, whose intensity increases from the first end to the second end of the light blocking wall 3, and the density distribution of the magnetic particles in each light blocking wall 3 is uniform or increases from the first end to the second free end of the light blocking wall 3.

In the anti-peeping device according to the first embodiment of the present invention, a knob (not shown) may act as the user input device. In this embodiment, the user input device may comprise at least a first knob and a second knob. The first knob is used for selecting the deflecting directions of the light blocking walls 3. For example, the rotation of the knob in a clockwise direction causes the light blocking walls 3 to deflect in a clockwise direction in FIG. 4, and the rotation of the knob in a counter-clockwise direction causes the light blocking walls 3 to deflect in a counter-clockwise direction in FIG. 4, or vice versa. The second knob is used for selecting the deflecting angles of the light blocking walls 3, and scales corresponding to deflecting angles of the light blocking walls 3 may provided at a peripheral region of the second knob.

With the anti-peeping device according to the first embodiment of the present invention, a user may select deflecting directions and/or deflecting angles of the light blocking walls 3 through the first knob and/or the second knob of the user input device respectively, then the magnetic field control device changes the direction and/or intensity of current applied to the electromagnetic components 2 based on instructions generated by rotating the first and/or the second knob, so as to adjust direction and/or intensity of the magnetic field generated by the electromagnetic components 2. Movement of the magnetic particles in each light blocking wall 3 under the influence of the magnetic field causes the light blocking wall 3 to deflect to a desired deflecting angle. When the current applied to the electromagnetic components 2 is removed, each light blocking wall 3 may return to its initial position, for example, a position at which the light blocking wall 3 is perpendicular to the plate-shaped substrate 1 under the restoring force thereof.

From the above, with the anti-peeping device according to the embodiment of the present application, an allowed range of viewing angle can be changed as required. In contrast to the existing anti-peeping device whose light blocking walls are fixed, the anti-peeping device according to embodiments of the present invention can be significantly improved in anti-peeping performance and applicability. Therefore, the allowed range of viewing angle can be changed without replacing a current anti-peeping device with one of a different type, and overall usage cost for users can be reduced.

The user input device may be realized in other ways. In one example, the user input device may comprise an information acquiring device, such as a gesture recognizing sensor. The gesture recognizing sensor can be used to recognize a gesture of a user and send the recognized gesture to the magnetic field control device. A corresponding relationship between gestures and control schemes concerning deflecting direction and deflecting angle of each light blocking wall 3 (or direction and intensity of the current applied to the electromagnetic components 2) may be pre-stored in the magnetic field control device. The magnetic field control device automatically adjusts direction and/or intensity of the magnetic field generated by the electromagnetic components 2 based on the recognized gestures and the corresponding relationship, such that each of the light blocking walls 3 may be deflected to a desired deflecting direction and deflecting angle. The gesture recognizing sensor may be realized by various existing sensors, such as a motion sensor, acceleration sensor, or the like.

In another example, the user input device may comprise at least two light sensors. Specifically, the at least two light sensors may be divided into two groups located respectively on two opposite sides of the plate-shaped substrate 1. In one example, each group comprises a plurality of light sensors. When a user shields at least one light sensor of one of the two groups, the magnetic field control device adjusts deflecting direction and/or deflecting angle of each light blocking wall 3 based on the group to which the shielded light sensors belong and the number of the shielded light sensors. For example, when a user using an electronic device provided with the anti-peeping device notices that there is another person standing on his left side, the user may shield the light sensors on the left side of the electronic device, such that the magnetic field control device adjusts the direction of magnetic field generated by the electromagnetic components 2 so as to deflect the light blocking walls 3 towards the right side, thereby an anti-peeping effect is achieved. Furthermore, the magnetic field control device may adjust intensity of magnetic field generated by the electromagnetic components 2 based on the number of shielded light sensors. For example, the more the light sensors are shielded, the higher the intensity of the magnetic field is.

After a long period of use, dust or debris may enter the anti-peeping device and thereby adversely affect light transmission of the anti-peeping device. In order to solve this problem, as shown in FIGS. 4, the anti-peeping device may further comprise a transparent cover plate 4 which is spaced apart from the plate-shaped substrate 1 and forms a closed space with the plate-shaped substrate 1 and the electromagnetic components 2. In another example, the anti-peeping device may further comprise a plurality of isolation plates (not shown) disposed at the peripheral region of the plate-shaped substrate 1, and a closed space is formed by the transparent cover plate 4, the plate-shaped substrate 1, and the isolation plates, such that the light blocking walls 3 and the electromagnetic components 2 are located in the closed space. The transparent cover plate 4 may be formed by transparent resin or transparent glass. The configurations above may prevent dust or debris from coming into the anti-peeping device, thereby avoiding a degradation of light transmission of the anti-peeping device. In a preferable example, the closed space is a vacuum space, and thereby an adverse effect on the movement of the light blocking walls 3 due to air resistance can be significantly reduced, such that sensitivity and accuracy of the anti-peeping device can be improved. However, the present invention is not limited to such a configuration. In other cases, such as a case in which it is required to achieve a certain refractive index in the anti-peeping device, the closed space formed between the transparent cover plate 4 and the plate-shaped substrate 1 may be filled with some special liquid or collosol so that the required refractive index may be achieved in the anti-peeping device.

Figure 6:
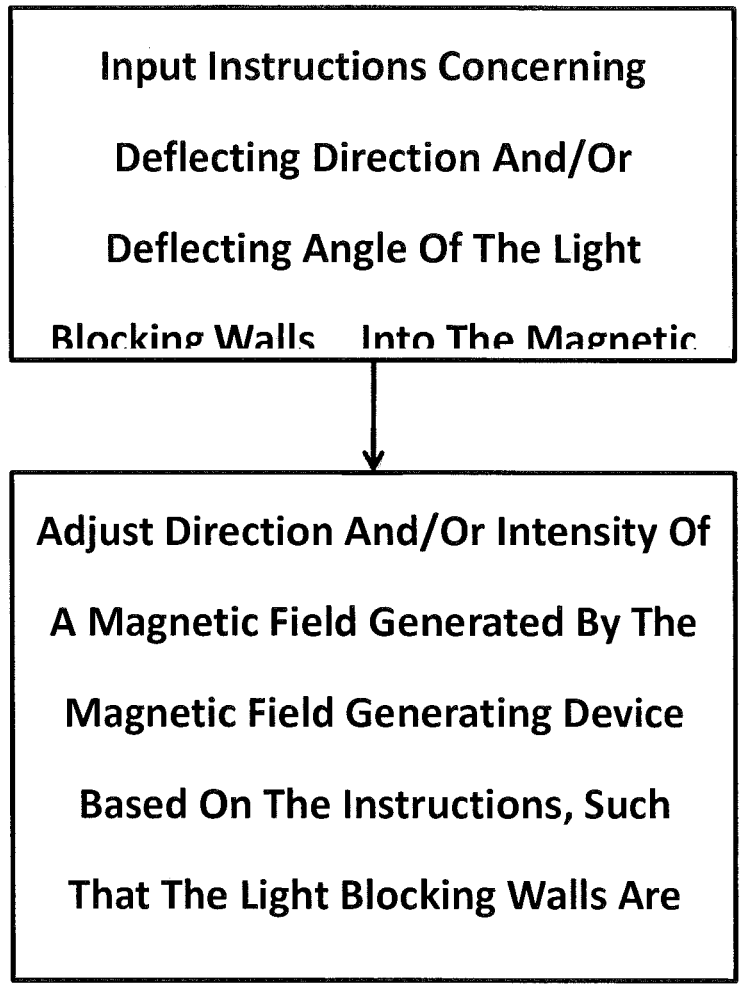
FIG. 6 is a flowchart of a control method for the anti-peeping device according to the first embodiment of the present invention.

FIG. 6 provides a flowchart of a control method for the anti-peeping device according to the first embodiment of the present invention. The control method may comprise the following steps:

Step 1: input instructions concerning deflecting direction and/or deflecting angle of the light blocking walls 3 into the magnetic field control device through the user input device;

Step 1: the magnetic field control device adjusts direction and/or intensity of the magnetic field generated by the magnetic field generating device through, for example, changing the direction and/or intensity of the current applied to the electromagnetic components 2, such that the light blocking walls 3 are deflected towards a desired direction and deflected to a desired deflecting angle under the influence of the magnetic field.

With the control method above, the anti-peeping device may adjust deflecting direction and/or deflecting angle of light blocking walls, which significantly improves anti-peeping effect and adaptability in contrast to conventional anti-peeping devices.

In some examples, user input device of the anti-peeping device may comprise one or more of knobs, gesture recognizing sensors, or light sensors.

In one example, the user input device may comprise a first knob and a second knob. The first knob is used for selecting deflecting direction of the light blocking walls 3. For example, the rotation of the knob in a clockwise direction causes the light blocking walls 3 to deflect in a clockwise direction in FIG. 4, and the rotation of the knob in a counter-clockwise direction causes the light blocking walls 3 to deflect in a counter-clockwise direction in FIG. 4, or vice versa. The second knob is used for selecting deflecting angle of the light blocking walls 3, and scales corresponding to deflecting angles of the light blocking walls 3 may provided at a peripheral region of the second knob. These scales may provide facilitation for selecting a desired deflecting angle for the light blocking walls 3.

In another example, the user input device may comprise a gesture recognizing sensor. The gesture recognizing sensor can be used to recognize a gesture of a user and send the recognized gesture to the magnetic field control device. A corresponding relationship between the gestures and control schemes concerning deflecting direction and deflecting angle of each light blocking wall 3 (or direction and intensity of the current applied to the electromagnetic components 2) may be pre-stored in the magnetic field control device. The magnetic field control device automatically adjusts direction and/or intensity of the magnetic field generated by the electromagnetic components 2 based on the recognized gestures and the corresponding relationship, such that each of the light blocking walls 3 may be deflected to a desired deflecting direction and/or deflecting angle.

In yet another example, the user input device may comprise a plurality of light sensors. Specifically, the plurality of light sensors are divided into two groups located respectively on two opposite sides of the plate-shaped substrate 1, and each group comprises a plurality of light sensors. When a user shields at least one light sensor of one of the two groups, the magnetic field control device adjusts the direction and/or intensity of the magnetic field generated by the electromagnetic components 2 based on the group to which the shielded light sensors belong and the number of the shielded light sensors, such that deflecting direction and/or deflecting angle of the light blocking walls are changed.

Second Embodiment

A second embodiment of the anti-peeping device is further provided. The anti-peeping device according to the second embodiment is substantially the same as the anti-peeping device according to the first embodiment, except that the anti-peeping device according to the second embodiment further comprises an information acquiring device (not shown) and a processing device (not shown) correlated to the information acquiring device.

Therefore, a basis arrangement of the anti-peeping device according to the second embodiment may also be represented by FIG. 4. As shown in FIG. 4, the anti-peeping device according to the second embodiment of the present invention comprises: a transparent plate-shaped substrate 1; a magnetic field generating device disposed on the plate-shaped substrate 1; and a plurality of light blocking walls 3 deflectably connected to the plate-shaped substrate 1 and disposed in parallel with each other. The magnetic field generating device may comprise at least one pair of electromagnetic components 2. The plurality of light blocking walls are disposed in one row and spaced apart from each other. A first end of each light blocking wall is deflectably connected to the plate-shaped substrate 1, and a second end of each light blocking wall opposite to the first end is a free end. With such an arrangement, when a magnetic field is generated by the electromagnetic components 2, all light blocking walls 3 are in the magnetic field. Each light blocking wall is configured to be deflectable in response to a change in direction and/or intensity of the magnetic field generated by the electromagnetic components 2. In one example, each light blocking wall 3 is provided with a plurality of magnetic particles (not shown), so that the light blocking wall 3 can be deflected in a clockwise direction or a counterclockwise direction by the magnetic particles under influence of the magnetic field. In other examples, each light blocking wall 3 may be provided with other magnetic objects, such as a permanent magnet.

The anti-peeping device according to the second embodiment further comprises: an information acquiring device (not shown) for acquiring features of a user's face; and a processing device (not shown) connected, for example, electrically or wirelessly to the magnetic field control device and the information acquiring device. The information acquiring device provides acquired features of a current user's face to the processing device. The processing device compares the acquired features of the current user's face to predetermined features of a predetermined user' face, and determines whether or not the current user is the predetermined user. If it is determined that the current user is the predetermined certain user, the information acquiring device acquires position information of the current user in real time and provides acquired position information to the processing device. The processing device controls direction and/or intensity of the magnetic field generated by the electromagnetic components 2 based on a relative position relationship between the current user and the anti-peeping device, such that deflecting direction and deflecting angle of the light blocking walls 3 are adjusted, and an automatic anti-peeping effect can be achieved. The step of determining whether or not a current user is a predetermined user comprises determining whether or not the acquired features of a current user's face is in consistent with predetermined features of a predetermined user's face.

Furthermore, if the current user moves out of an identifying region of the anti-peeping device, or the current user initiatively ends the automatic anti-peeping function, the automatic anti-peeping process is ended.

Figure 7:
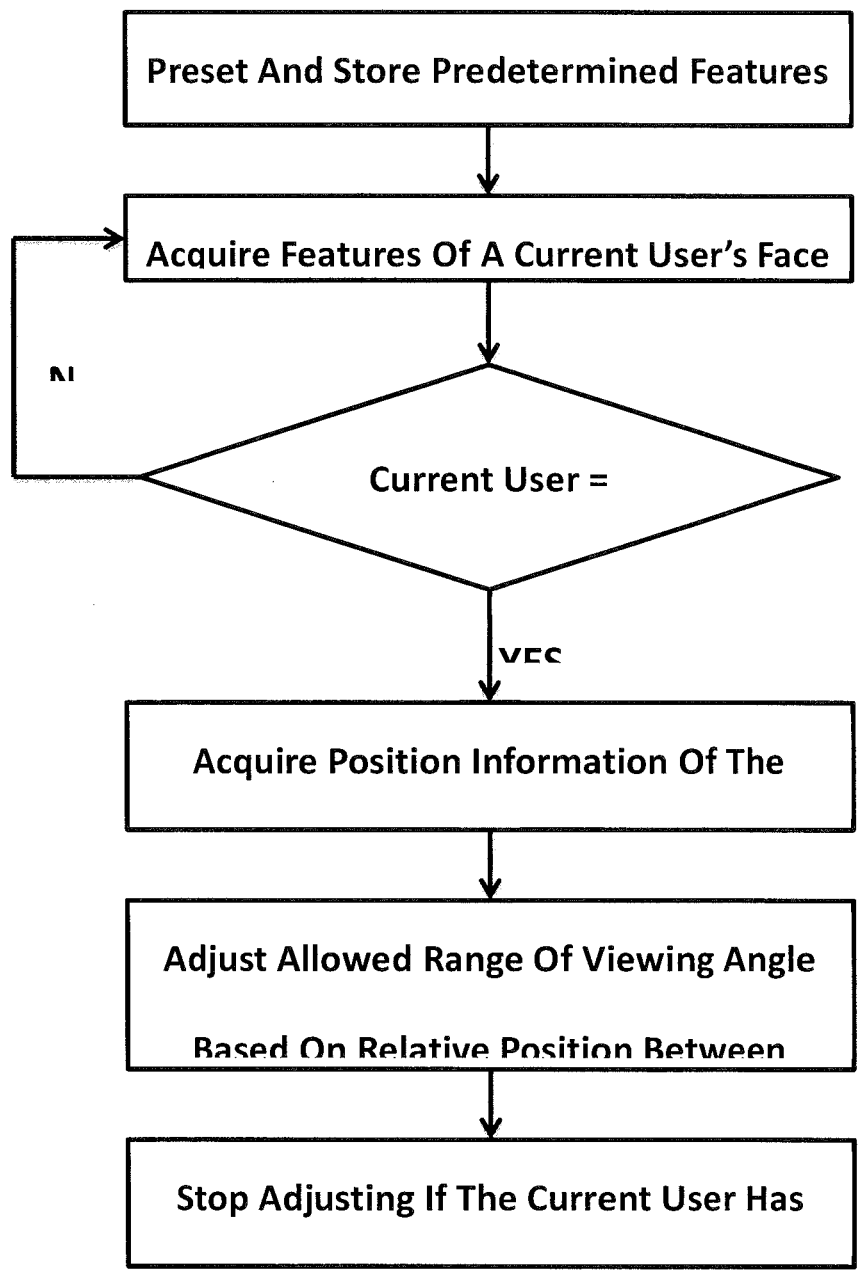
FIG. 7 is a flowchart of a control method for the anti-peeping device according to the second embodiment of the present invention.

FIG. 7 provides a flowchart of a control method for the anti-peeping device according to the second embodiment of the present invention. The control method comprises steps as follows:

Step 1: preset and store predetermined features of a predetermined user's face, for example, in the processing device;

Step 2: use the information acquiring device to acquire features of a current user's face and provide the acquired features to the processing device;

Step 3: compare the acquired features with the predetermined features through the processing device to determine whether or not the current user is the predetermined user;

Step 4: if it is determined that the current user is not the predetermined user, Step 2 and Step 3 are repeated until it is determined that the current user is the predetermined user;

Step 5: if it is determined that the current user is the predetermined user, the information acquiring device acquires position information of the current user in real time and provides acquired position information to the processing device;

Step 6: control the deflecting direction and/or deflecting angle of the light blocking walls based on a relative position relationship between the current user and the anti-peeping device through the processing device.

Briefly, the control method for anti-peeping device according to the second embodiment of the invention comprises steps of: presetting predetermined features of a predetermined user's face; acquiring features of a current user's face; comparing the acquired features with the predetermined features to determine whether the current user is the predetermined user; repeating the acquiring step and the comparing step, if it is determined that the current user is not the predetermined user; activating an automatic anti-peeping function and acquiring position information of the current user in real time, if it is determined that the current user is the predetermined user; adjusting or changing deflecting direction and/or deflecting angle of the light blocking walls based on a relative position relationship between the current user and the anti-peeping device. Optionally, if the current user moves out of an identifying region or a detectable region of the anti-peeping device, or the current user initiatively ends the automatic anti-peeping function, the automatic anti-peeping process ends, or the adjusting step is terminated.

In the above control method, the comparing step may be realized through many different ways. For example, if a predetermined condition is met, the processing device determines that the current user is the predetermined user. The predetermined condition may be met when the features of the current user's face totally consist with the predetermined features, or when the features of the current user's face have at least 90% consistence with the predetermined features.

In another example, the features of the current user's face may be processed through an algorithm, and the processed features are compared with the predetermined features.

It is to be noted that specific technical features, structures, and materials throughout the specification can be combined in a suitable way, as long as it does not conflict with basic principles of the present invention.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

What is claimed is:

1. An anti-peeping device, comprising:
   a plate-shaped substrate;
   a magnetic field generating device disposed on the plate-shaped substrate for generating a magnetic field;
   a plurality of light blocking walls disposed on the plate-shaped substrate to be within the magnetic field, the plurality of light blocking walls being disposed in parallel with and spaced apart from one another, a first end of each light blocking wall being deflectably connected to the plate-shaped substrate, and each light blocking wall being configured to be changeable in its deflecting direction and/or deflecting angle in response to a change in a direction and/or an intensity of the magnetic field;
   a magnetic field control device for controlling the direction and intensity of the magnetic field; and
   a user input device for receiving an instruction from a user,
   wherein the magnetic field control device is configured to control the magnetic field generating device to adjust the direction and/or the intensity of the magnetic field based on an instruction received from the user input device, so as to change the deflecting direction and/or the deflecting angle of the light blocking walls.

2. The anti-peeping device according to claim 1, wherein each light blocking wall comprises a plurality of magnetic particles therein, and the plurality of magnetic particles are configured to be moveable under the effect of the magnetic field, so as to cause the light blocking wall to deflect.

3. The anti-peeping device according to claim 1, wherein the magnetic field generating device comprises a pair of electromagnetic components disposed at two opposite sides of the anti-peeping device respectively.

4. The anti-peeping device according to claim 1, wherein magnetic field generating device comprises a plurality of pairs of electromagnetic components, and each pair of electromagnetic components are disposed on two opposite sides of a corresponding light blocking wall, so that each light blocking wall is disposed in a magnetic field generated by a corresponding pair of electromagnetic components.

5. The anti-peeping device according to claim 1, wherein each light blocking wall is a rigid light blocking wall connected to the plate-shaped substrate with a flexible connection or, each light blocking wall is a flexible light blocking wall.

6. The anti-peeping device according to claim 1, wherein each light blocking wall has a free end opposite to the first end, and a cross-section of each light blocking wall is in a shape of a triangle or a trapezoid, the width of which is gradually increased from the first end to the free end of each light blocking wall; and wherein a distribution density of the magnetic particles is uniform within each light blocking wall or increased from the first end to the free end of each light blocking wall.

7. The anti-peeping device according to claim 6, wherein the intensity of the magnetic field generated by the magnetic field generating device is uniform or gradually increased in a direction away from the plated-shaped substrate.

8. The anti-peeping device according to claim 1, wherein each light blocking wall has a free end opposite to the first end, and a cross-section of each light blocking wall is in a shape of a rectangle.

9. The anti-peeping device according to claim 8, wherein the magnetic field generated by the magnetic field generating device is an uniform magnetic field, and wherein a distribution density of the magnetic particles within each light blocking wall is increased from the first end to the free end of the light blocking wall.

10. The anti-peeping device according to claim 8, wherein the intensity of the magnetic field generated by the magnetic field generating device is increased in a direction away from the plated-shaped substrate, and wherein the distribution density of the magnetic particles within each light blocking wall is uniform or increased from the first end to the free end of the light blocking wall.

11. The anti-peeping device according to claim 1, wherein the user input device comprises a first knob and a second knob, the first knob is configured to select a deflecting direction for the light blocking walls, and the second knob is configured to select a deflecting angle for the light blocking walls.

12. The anti-peeping device according to claim 1, wherein the user input device comprises a gesture recognizing sensor for recognize a gesture of a user, the magnetic field control device has information on predetermined gestures stored therein, and the predetermined gestures are associated with predetermined deflecting directions and/or deflecting angles of the light blocking walls,
   and wherein the magnetic field control device is configured to adjust the direction and/or the intensity of the magnetic field based on the recognized gesture and the predetermined gestures.

13. The anti-peeping device according to claim 1, wherein the user input device comprises two groups of light sensors located respectively on two opposite sides of the plate-shaped substrate, and each group comprises a plurality of light sensors;
   and wherein the magnetic field control device is configured to adjust the direction and/or intensity of the magnetic field based on shielded light sensors.

14. The anti-peeping device according to claim 1, further comprising a transparent cover plate, wherein a closed space is formed between the transparent cover plate and the plate-shaped substrate, and the light blocking walls are disposed in the closed space.

15. The anti-peeping device according to claim 14, the closed space is a vacuum space.

16. A control method for the anti-peeping device of claim 1, the control method comprises steps of:
   inputting an instruction through the user input device; and
   adjusting the direction and/or intensity of the magnetic field generated by the magnetic field generating device through the magnetic field control device.

17. The control method according to claim 16,
   wherein the user input device comprises a first knob and a second knob, the first knob is configured to select a deflecting direction for the light blocking walls, and the second knob is configured to select a deflecting angle for the light blocking walls, and
   wherein the step of inputting an instruction through the user input device comprises:
   selecting a deflecting direction for the light blocking walls by the first knob; and/or
   selecting a deflecting angle for the light blocking walls by the second knob.

18. The control method according to claim 16,
   wherein the user input device comprises a gesture recognizing sensor for recognizing a gesture of a user, the magnetic field control device has information on predetermined gestures stored therein, the predetermined gestures are associated with predetermined deflecting directions and/or deflecting angles of the light blocking walls, and the magnetic field control device is configured to adjust the direction and/or the intensity of the magnetic field based on the recognized gesture and the predetermined gestures; and wherein the control method comprises steps of:
acquiring a gesture of a user through the gesture recognizing sensor;
retrieving a predetermined gesture corresponding to the acquired gesture; and
adjusting the direction and/or the intensity of the magnetic field generated by the magnetic field generating device based on the predetermined deflecting direction and/or deflecting angle of the light blocking wall associated with the retrieved predetermined gesture.

19. The control method according to claim 16,
wherein the user input device comprises two groups of light sensors located respectively on two opposite sides of the plate-shaped substrate, and each group comprises a plurality of light sensors, and the magnetic field control device is configured to adjust the direction and/or intensity of the magnetic field based on shielded light sensors; and wherein the control method comprises steps of:
shielding at least one light sensor of one of the two groups;
determining the locations and the number of shielded light sensors; and
adjusting the direction and/or the intensity of the magnetic field generated by the magnetic field generating device based on the determined locations and number of the shielded light sensors.

\* \* \* \* \*